US005619695A

United States Patent [19]
Arbabi et al.

[11] Patent Number: 5,619,695
[45] Date of Patent: Apr. 8, 1997

[54] METHOD AND APPARATUS FOR SCHEDULING RESOURCES

[75] Inventors: Mansur Arbabi; Jonathan E. Baniak, both of Montgomery County, Md.

[73] Assignee: Lockheed Martin Corporation, Manassas, Va.

[21] Appl. No.: 190,964

[22] Filed: Feb. 3, 1994

[51] Int. Cl.⁶ .................................................. G06F 9/455
[52] U.S. Cl. ........................................ 395/670; 395/674
[58] Field of Search ........................... 395/650; 364/402

[56] References Cited

U.S. PATENT DOCUMENTS

| | | | |
|---|---|---|---|
| 4,122,523 | 10/1978 | Morse et al. | 364/436 |
| 4,256,925 | 3/1981 | Goode | 370/104 |
| 4,672,536 | 6/1987 | Giroir et al. | 395/729 |
| 4,744,026 | 5/1988 | Vanderbei | 364/402 |
| 4,852,001 | 7/1989 | Tsushima et al. | 364/401 |
| 4,896,369 | 1/1990 | Adams, Jr. et al. | 455/12 |
| 4,912,656 | 5/1990 | Cain et al. | 364/514 |
| 5,031,089 | 7/1991 | Liu et al. | 364/200 |
| 5,053,970 | 10/1991 | Kurihara et al. | 364/468 |
| 5,111,391 | 5/1992 | Fields et al. | 364/401 |
| 5,128,860 | 7/1992 | Chapman | 364/401 |
| 5,148,370 | 9/1992 | Litt et al. | 364/468 |
| 5,153,877 | 10/1992 | Esaki et al. | 370/94.1 |
| 5,202,993 | 4/1993 | Tarsy et al. | 395/700 |
| 5,210,872 | 5/1993 | Ferguson et al. | 395/650 |
| 5,212,791 | 5/1993 | Damian et al. | 395/650 |
| 5,216,427 | 6/1993 | Yan et al. | 342/352 |
| 5,216,593 | 6/1993 | Dietrich et al. | 364/402 |
| 5,241,465 | 8/1993 | Oba et al. | 364/401 |
| 5,270,920 | 12/1993 | Pearse et al. | 364/401 |
| 5,291,397 | 3/1994 | Powell | 364/402 |
| 5,319,781 | 6/1994 | Syswerda | 395/650 |
| 5,325,525 | 6/1994 | Shan et al. | 395/650 |
| 5,367,687 | 11/1994 | Tarsy et al. | 395/700 |
| 5,406,476 | 4/1995 | Deziel, Jr. et al. | 364/402 |
| 5,432,887 | 7/1995 | Khaw | 395/650 |

OTHER PUBLICATIONS

Rhinehart & Beasley "Dynamic Programming for Chemical Engineering Applications", Chemical Engineering Dec. 7, 1987 p. 113, vol. 94 No. 18.

Journal of the Association for Computing Machinery, vol. 21, No. 1, Jan. '74 pp. 66–75, Scheduling for Minimum Total Loss Using Service Time Distributions by Kenneth C. Sevcik.

Hain, T.C., "Heuristic method for resource constrained project scheduling", Journal of the Institution of Engineers, vol. 6, issue 65, pp. 183–186 May 85.

(List continued on next page.)

*Primary Examiner*—Alvin E. Oberley
*Assistant Examiner*—St. John Courtenay, III
*Attorney, Agent, or Firm*—Mark A. Wurm, Esquire; Whitham, Curtis, Whitham & McGinn

[57] ABSTRACT

An improved scheduling system is effective to schedule resources in a resource constrained environment. The first step in the process is initialization wherein the set of requests to be scheduled and the processing controls are input to the system. A primary sort is done to determine the order of request processing according to an "importance" ranking. Next, the feasible segments are determined. This determination defines the times where the request could conceivably be scheduled with respect to constraints and resource availabilities. A dynamic laxity determination implements a set of heuristics which models a request's allocation possibilities by taking into account the remaining unscheduled requests with which it conflicts. Account is taken of those requests which require multiple concurrent resources by combining multiple resources. A worthiness determination is made which defines a function indicating advantageous start times admitting high worth values. The best start time is determined for request scheduling by combining factors such as worth and request interactions. The request is then placed into the schedule. The primary sort is then resorted in light of the present schedule and processing controls.

12 Claims, 9 Drawing Sheets

OTHER PUBLICATIONS

Norris, "Two level heuristic for the resource constrained scheduling problem", International Journal of Production Research, vol. 24, Issue 5, pp. 1203–1219 1986.

Elsayed, E.A., "Heuristics for resource constrained scheduling", International Journal of production research, vol. 24, No. 2, pp. 299–310 1986.

Dean et al., "Multiproject Staff Scheduling with Variable Resource Constrants", IEEE Transactions on Engineering Managment, vol. 39, Issue 1, pp. 59–72 1992.

Norbis, M.I., "A Multiobjective Multi Level Heuristic for Dynamic Resource Constrained Scheduling Problems", European Journal of Operational Research, vol. 33, Issue 1, pp. 30–41 1988.

Cooper, D.F., "Heuristics for scheduling resource constrained projects", Management Science, vol. 22, Issue 11, pp. 1186–1194 1976.

Khattab et al., "A New Heuristic for Project Scheduling with a Single Resource Constraint", vol. 20, Issue 3, pp. 381–387 1991.

USER REQUEST
200

METHOD AND APPARATUS FOR SCHEDULING RESOURCES

BACKGROUND OF THE INVENTION

1. Field of the Invention

The present invention generally relates to the planning and scheduling of resources and, more particularly, to the problem of scheduling resources in a resource constrained environment. The invention relates to that class of data processing generally known as expert or knowledge-based systems.

2. Description of the Prior Art

Resource constrained environments are found in a wide variety of contexts such as communications systems, range resources in the command and control arena, and shared aircraft support systems. For example, ground-based systems for satellite command, control and communications operations require a method for planning, scheduling and assigning the range resources such as antenna systems scattered around the world, communications systems and personnel. The method must accommodate user priorities, last minute changes, maintenance requirements, and exceptions from nominal requirements. Solutions to the scheduling problem are becoming more important as budget constraints and increasingly complex resource configurations force customers to find efficient methods of scheduling those resources.

Prior art resource scheduling efforts addressed a simpler problem. The objective of past efforts was to schedule as many requests as possible, under priority and constraint stipulations. The conventional method used for resource scheduling is mathematical programming. Mathematical programming is combinatorially explosive (and computationally intensive) in its search for the optimum solution to a problem as it considers all requests simultaneously. The class of problem addressed by the present invention is outside of the realm of mathematical programming due to the size of the problem (number of requests, resources and constraints) and processing time limitations.

SUMMARY OF THE INVENTION

It is therefore an object of the present invention to provide an improved scheduling system which is effective to schedule resources in a complex resource constrained environment.

In accordance with a preferred embodiment of the present invention, the first step in the process is initialization wherein the set of requests to be scheduled and the processing controls are input to the system. A primary sort is done to determine the order of request processing according to an "importance" ranking. Next, the feasible segments are determined. This determination defines the times where the request could conceivably be scheduled with respect to constraints and resource availabilities. A dynamic laxity determination implements a set of heuristics which models a request's allocation possibilities by taking into account the remaining unscheduled requests with which it conflicts. Account is taken of those requests which require multiple concurrent resources by combining multiple resources. A "worthiness" determination is made which defines a function indicating advantageous start times admitting high worth values. The best start time is determined for request scheduling by combining factors such as worth and request interactions. The request is then placed into the schedule. The primary sort is then resorted in light of the present schedule and processing controls.

The present invention incorporates innovative methods to reduce the complexity of the scheduling problem, including Laxity Heuristics, a procedural implementation of an expert system approach which evaluates the list of unscheduled requests to choose a resource allocation which leaves as many options as possible for the remaining requests. The present invention includes worth considerations in its scheduling "constraints". The invention provides a process for reconciling goals such as "schedule as many requests as possible" and "optimize plan worth". The incorporation of tools such as fuzzy set logic in the present invention processing allows for the integration of as many actual scheduling parameters as desired to determine the schedule.

The present invention presents a near optimum answer (as opposed to a mathematically optimum answer) which is acceptable for the class of problems addressed. The approach followed in the present invention resulted from interviews with scheduling experts and the ways they make decisions.

One goal of the invention is to maximize plan worth for a very general class of request. Associated with each request is a worth profile. The profile is a worth versus time mapping indicating the value of scheduling a request at various start times. Thus, the problem solved by the present invention is not one of scheduling the most requests, but it is one of scheduling the requests which provide the greatest total plan worth.

Along with maximizing plan worth, the problem addressed by the present invention has the following other features:

A new request type: These requests have ranges of durations (from minimum to maximum) and ranges of start times.

Temporal constraints among requests is provided for: The existence of a request in the plan can necessitate the existence of another request in a specific temporal relationship (linked start and/or stop times) to the first.

The present invention addresses the resource scheduling problem; that is, the allocation of highly constrained resources to satisfy requests having time dependent worth profiles and complex duration and start time requirements. The tunability of the decision making approach makes the present invention an effective tool to obtain optimum resource allocation schedules in a wide range of fields.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Definitions

"Resource Scheduling" is the process by which resources are allocated to satisfy user requests.

"Request" is a user-supplied task requiring the allocation of resources. Requests consists of five components which are window, duration, resources desired requisite requests, and worth profile.

"Window" is the time period which the user desires resources.

"Duration" is the desired length of resource allocation. It is expressed as a range from a minimum to a maximum acceptable length of time.

"Resources desired" are the resources which must be allocated to satisfy the request.

"Requisite requests" are constraints which temporally bind two requests together. Both requests must be allocated while in the correct temporal relationship to satisfy the request.

"Worth profile" is a function indicating worth versus time used to determine times that request allocation is desired (i.e., a high worth).

"Segment" is a continuous portion of a request's window in which the resources are available (i.e., they have not been previously allocated). There may be several segments for a request's window.

"Admissible start times" are all possible times for a request's segment.

"Feasible start times" are those admissible start times which adhere to requisite request constraints.

"Heuristics" are guidelines or rules of thumb or expert rules or knowledge based on practical experience of experts in the field of study.

"Laxity heuristics" are the collection of look-ahead expert rules which maximize opportunity for yet unscheduled requests.

"Static laxity" is a factor indicating the ease to schedule (i.e., a comparison of duration to segment or window length).

"Dynamic laxity" is an indicator of interaction among requests.

Overview

Figure 1:
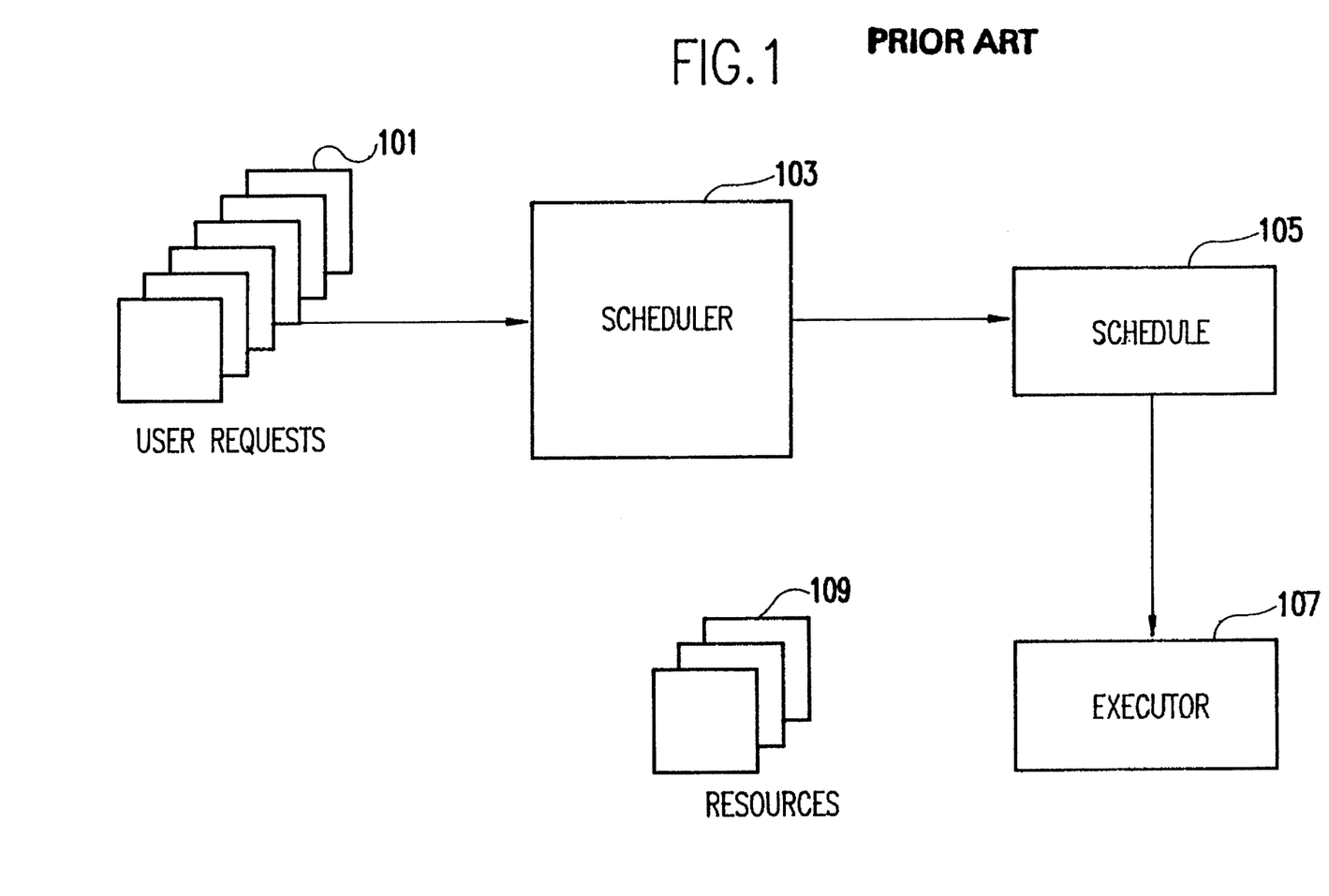
FIG. 1 is a functional block diagram used to provide an overview of the invention.

Referring now to the drawings, and more particularly to FIG. 1, there is shown a functional block diagram which is useful for providing an overview of the present invention. User requests 101 are input to a scheduler 103, and the scheduler 103 processes the user requests 101 producing a schedule 105. The scheduler 103 must allocate resources 109 to produce the schedule 105 satisfying the user requests 101. The resources 109 can consist of any item or object. Examples of resources are manufacturing lines, manufacturing machines, satellites, computers, processors, sensors, collectors, displays; in essence, any object or item to be shared among multiple users. The schedule 105 generated from a set of user requests 101 may be actually implemented using an executor 107. Thus, if the resources 109 from a set of user requests 101 was applied to the scheduler 103 to generate a schedule 105, the executor 107 would cause the resources to be utilized according to the schedule 105. The subject invention, however, specifically addresses the problem of generating the schedule 105.

Detailed Description of the Elements

In order to describe the scheduling process, it is first necessary to understand the components of user requests. User requests and the information contained in the user requests are of critical importance to the practice of the invention.

Figure 2:
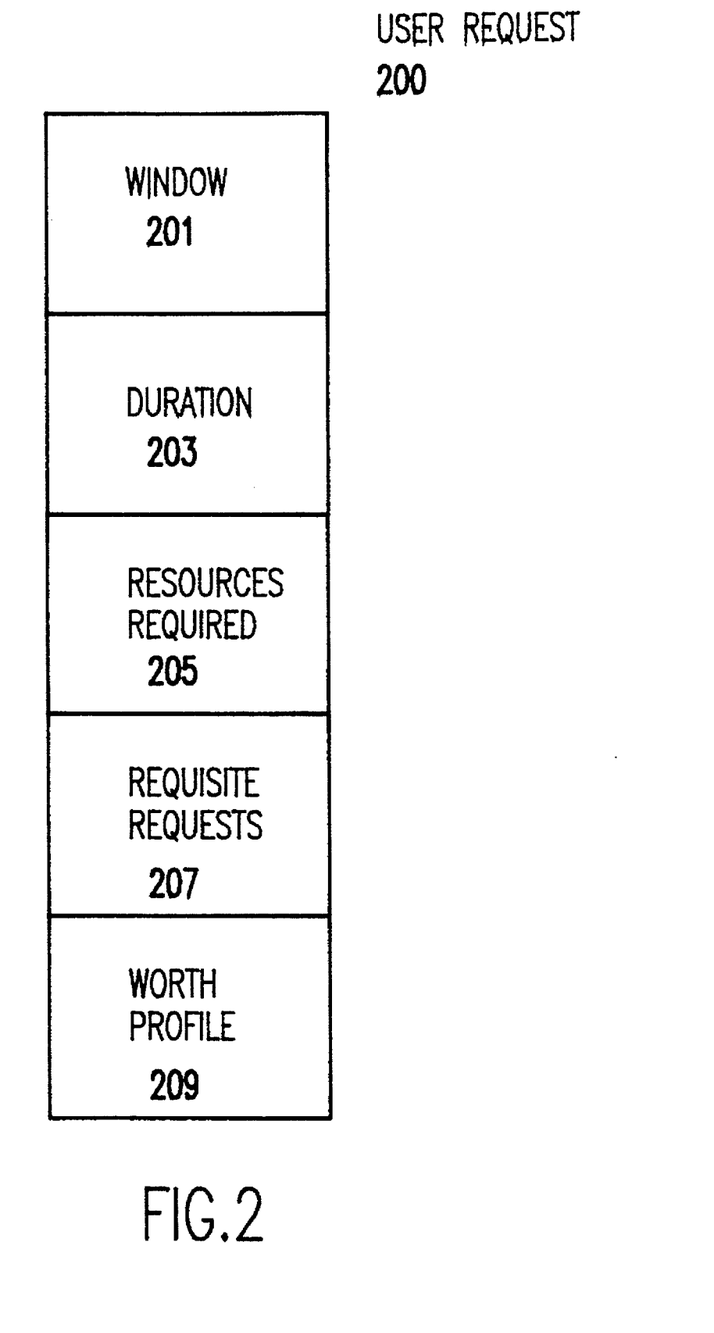
FIG. 2 is a functional block diagram illustrating the five components of a user request.

User requests, as stated in the definitions supra and as shown in FIG. 2, consist of five components. More specifically, a user request 200 has the user request associated components of a window 201, a duration 203, a resources desired 205, requisite requests 207, and a worth profile 209. The window 201 is the period of time the user desires the resources, while the duration 203 is the desired length of resource allocation within the window. Resources desired 205 are the resources which must be allocated to satisfy the request. The requisite requests 207 are the constraints that temporally bind two requests together. The worth profile 209 is a function indicating the worth versus time.

Figure 3:
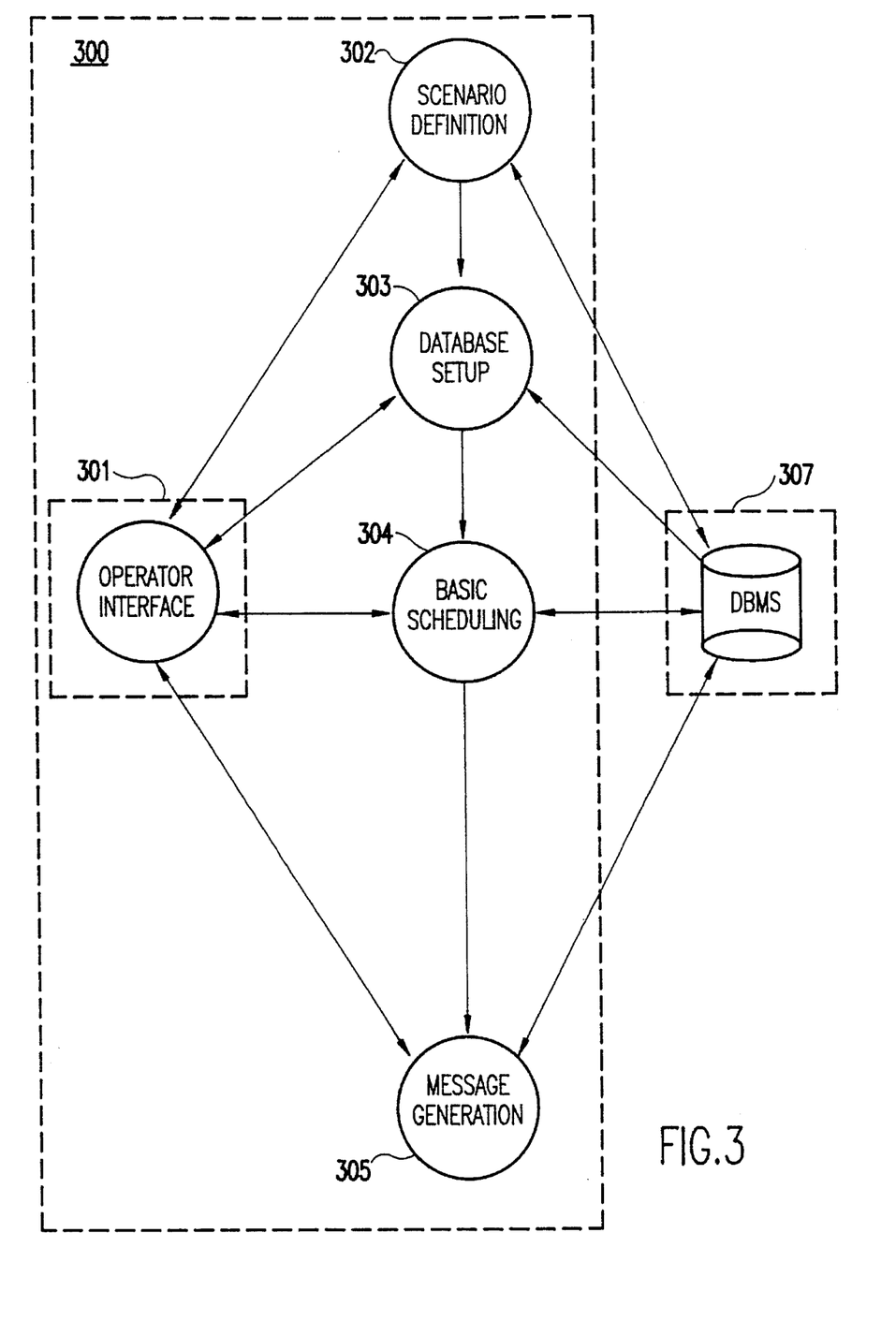
FIG. 3 is a functional block diagram of the architecture of the resources scheduling system according to the invention.

The architecture of the apparatus which implements the scheduling method according to the invention is shown in FIG. 3. A database processor 300 is provided with a user interface 301. The interface 301 may be implemented using, for example, X-Windows or other graphic user interface (GUI). The user interface 301 communicates with several components of the database processor including first the scenario definition component 302, followed by the database setup component 303, then the scheduling component 304. The output of the scheduling component 304 is directed to the message generation component 306 which communicates with the operator interface 301 to display any messages generated during or as a result of the scheduling process. Each of the four components of the database processor access a database 307 via a database management system (DBMS).

Description of the Scheduling Process

The heuristic followed in the practice of the invention is to address requests for scheduling one at a time. There are three methods of "look ahead" used to implement this paradigm.

1. The requests are initially sorted and considered in order of the degree of flexibility (static laxity) of each for scheduling. That is, those requests which have fewest possible placements in the schedule are considered first.
2. Each request is scheduled so that it leaves the greatest possibility for scheduling of the remaining requests (dynamic laxity).
3. As requests are scheduled, the resource world state changes, and resorting is done to reflect that new resource state. Therefore, a new order for request consideration is followed.

Figure 4:
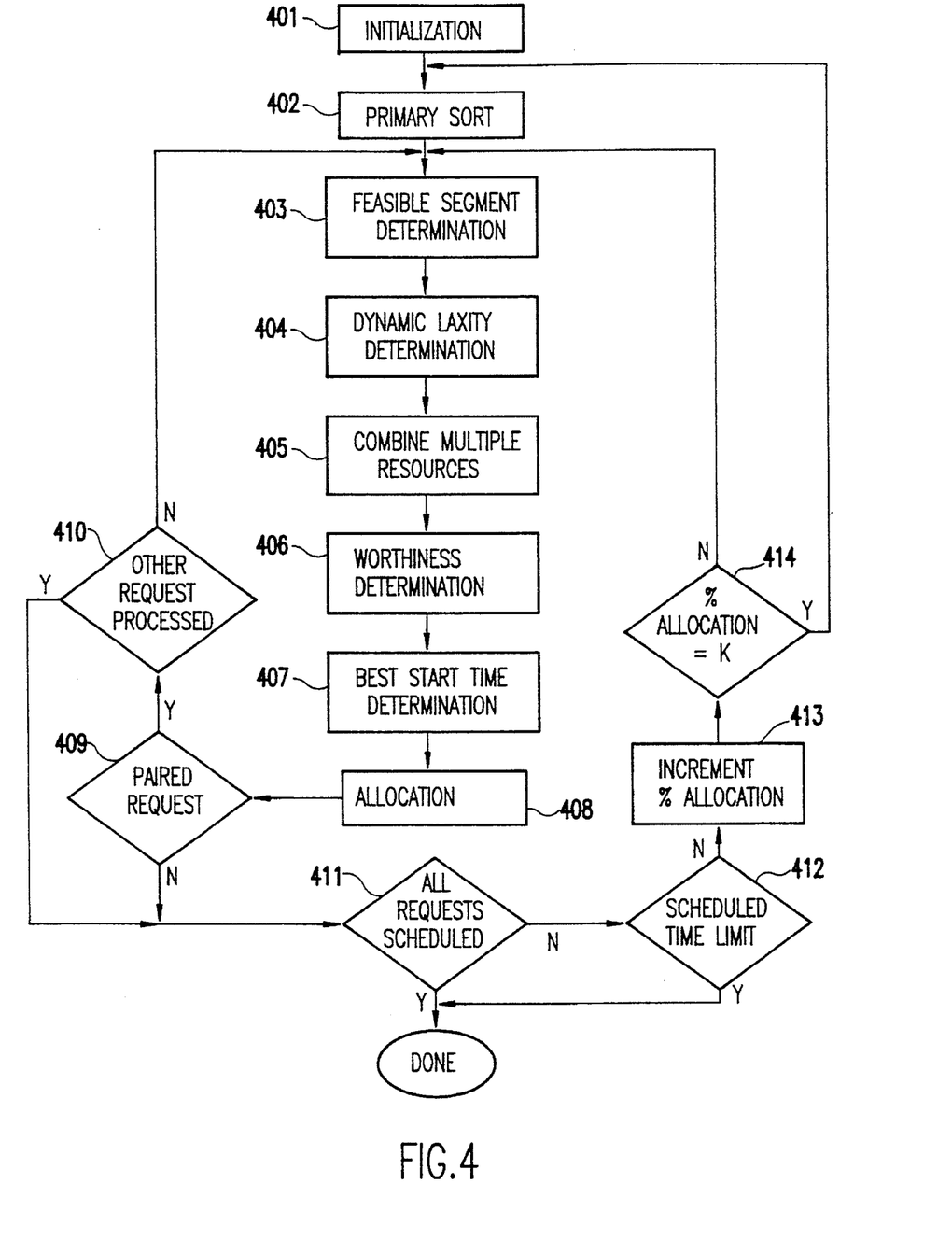
FIG. 4 is a flow diagram showing the logic of the basic scheduling flow.

The process is illustrated in the flow diagram of FIG. 4, to which reference is now made.

The first step in the process is initialization 401 wherein the set of requests to be scheduled and the processing controls are input to the system. A primary sort 402 is done to determine the order of request processing according to an "importance" ranking. Next, the feasible segments are determined at 403. This determination defines the times where the request could conceivably be scheduled with respect to constraints and resource availabilities. Taking the example of a communications satellite tracking range when satellites may have a limited acquisition time period by a ground tracking station, a request for downloading data from a satellite must be scheduled for that time period.

The dynamic laxity determination 404 implements a set of heuristics which models a request's allocation possibilities by taking into account the remaining unscheduled requests with which it conflicts. Again, with respect to the satellite communications example, the duration of the access request may be in the range of, say, five to ten minutes, although the total time the satellite is acquired by the ground station may be, say, one hour. Account is taken in 405 of those requests which require multiple concurrent resources by combining multiple resources. In the example, access to the satellite might involve such resources as the tracking antenna, the transceiver, and a local ground station signal and data processing system.

A worthiness determination 406 is made which defines a function indicating advantageous start times admitting high worth values. The best start time is determined 407 for request scheduling by combining factors such as worth and request interactions. The request is then placed into the schedule at allocation step 408. A test is made in decision block 409 to determine if the processed request is paired with a reference request. In the example given, a paired request might be a land line between the ground station and a central communications office. These requests are temporally linked, i.e., they are linked in time. The land line resource is not needed until sometime after the data has been downloaded from the satellite and processed at the ground station. On the one hand, the land line should be scheduled so as not to overlap the completion of its paired request (the downloading and processing of the data from the satellite), and on the other hand, the storage of the processed data at the ground station may be temporary requiring connection and transmission to the central communications office before the data is lost.

If the processed request is paired with a reference request, a further test is made to determine if the paired request has been processed. If not, then this flow is immediately repeated (starting at step 403) for the requisite request. Note that in our example, if a one of the requests (satellite access or land line) cannot be scheduled, the other request is not scheduled. If there was not a paired request or both requests have been processed, a test is made in decision block 411 to determine if all requests have been scheduled. If so, the process is complete; otherwise, a further test is made in decision block 412 to determine if a time limit for the scheduling process has expired. If so, the process ends with the scheduling completed within the time limit.

The invention contemplates taking a "review" of the scheduling at predetermined points in the process. In the initial primary sort, requests will be scheduled in a certain order which may not be entirely optimum based, in part, on the requests which remain unscheduled at this point in the process. Therefore, the invention builds in a resort capability aimed at optimizing the scheduling process. This is implemented as a resort at, say, five percent increments. In FIG. 4, if the time limit for the scheduling process has not expired, the percent of the allocation completed is incremented and a variable K is set equal to the incremented value in step 413. For example, the initial value for the percent of the allocation completed is set to zero so that, for five percent increments, the variable K will be set to 5% on the first pass, 10% on the second pass, and so forth. Then in decision block 414, a test is made to determine if the percentage of requests allocated equals the variable K. If not, then the flow returns to step 403; otherwise, the flow returns to step 402. The primary sort is then resorted in light of the present schedule and processing controls.

The processes illustrated in FIG. 4 will now be described in more detail below.

Figure 5:
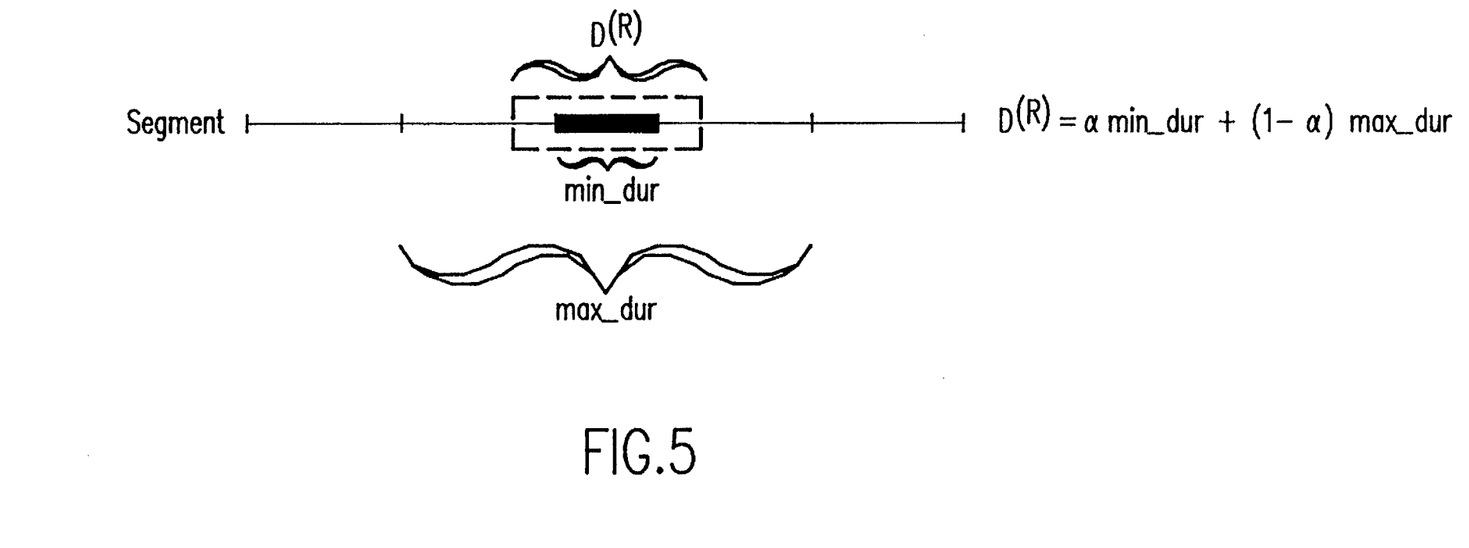
FIG. 5 is a graphical illustration of the request duration.

On initialization in step 401, the requests, constraints, resource availabilities, and processing controls are input to the processing system. As shown in FIG. 5, each request R has an associated range of desired durations from minimum (min_dur) to maximum (max_dur). The duration, D(R), used in the processing is computed using a database element, alpha, which is a function of R and external influences as expressed below:

$$D(R)=\omega\text{min\_dur}+(1-\alpha)\text{max\_dur},\ 0 \leq c \leq 1.$$

Alpha is dependent on external (expert scheduler) factors including the density of requests in a given time period (i.e., if resource contention is high for a given time period, then it may be advantageous to start with D(R) close to min_dur, alpha close to one);

a prioritization by purpose of the resource request (by which a request's maximum duration may be necessitated, alpha close to zero); and overall considerations (determined by the general makeup of the request set and previous knowledge).

The primary sort in step 402 of FIG. 4 identifies critical items up front so that the sort reflects the desired characteristics of the schedule to be produced. The care taken in this step will determine how effective the one-at-a-time scheduling paradigm is for the class of scheduling problems addressed by the system. The sorting of requests to be scheduled is done with respect to either single or multiple factors. An example of a single factor is static laxity. This factor indicates the degree of scheduling flexibility for a requests (i.e., its scheduling options) and is expressed as $$\text{Static\_Laxity}=D(R)/\text{Segment\_length}.$$

The "hardest to schedule" requests (the requests with the fewest scheduling options) have the smallest Static_Laxity values and would be ranked highest. Multiple factors are a weighted combination of factors such as static laxity and worth (including considerations of maximum work placement as well as the shape of the worth profile or spread). In case of ties, rules are followed such as:

Consider the overlap matrix, $\overline{R}$, where $R_{ij}=1$ if Request $R_i$'s segment overlaps Requests $R_j$'s segment. Using matrix $\overline{R}$, it is easy to determine which requests have least conflicts with other requests. A tie breaker rule would be to schedule first the requests which have fewest overlaps.

Schedule the request with earliest segment start.

The system deals with segments, which are the possible times that a request could possibly have its resources allocated. In step 403, a Feasible Segment is the subset of a Request's segment where a request can be satisfied with respect to required (requisite) pairings and other requests. The process of Feasible Segment determination can be summed up as follows:

1. Determine Segment—The possible start and stop times define the request window. Resource availability data pares the window until a segment remains. The segment is a time interval where an actual allocation of resources for the requests could take place if the request was being scheduled by itself (i.e., it was not being considered part of a requisite chain).

2. Determine Feasible Segments—Once the segment(s) for a request have been determined, then requisite constraint restrictions are imposed. Requisite constraints impose temporal relationships between requests. They define "linking" between two requests, the reference and the requisite.

Three types of requisite relationships are defined. They specify how the reference and requisite requests are tied together.

Four quantities are specified along with the defined type of requisite relationship. $T_1$, $T_2$, $T_3$, and $T_4$ can be negative, positive, or zero. They may be unspecified, indicating an open-ended relationship. Also, $T_1 \leq T_2$ and $T_3 \leq T_4$. The requisite relationships and their effects on the scheduling of the requisite request (and back in turn to restrict the reference segment) are the prerequisite constraint, the postrequisite constraint, and the corequisite constraint. The prerequisite constraint bounds the requisite request start and stop relative to the reference request START time:

$$\text{Ref\_start}+T_1 \leq \text{Req\_start} \leq \text{Ref\_start}+T_2, \text{ and}$$

$$\text{Ref\_start}+T_3 \leq \text{Req\_stop} \leq \text{Ref\_start}+T_4.$$

The postrequisite constraint bounds the requisite request and stop relative to the reference request STOP time:

$$\text{Ref\_stop}+T_1 \leq \text{Req\_start} \leq \text{Ref\_start}+T_2, \text{ and}$$

$$\text{Ref\_stop}+T_3 \leq \text{Req\_stop} \leq \text{Ref\_start}+T_4.$$

The corequisite constraint bounds the requisite request start relative to the reference request START time and bounds the requisite stop relative to the reference request STOP time:

$$\text{Ref\_start}+T_1 \leq \text{Req\_start} \leq \text{Ref\_start}+T_2, \text{ and}$$

$$\text{Ref\_stop}+T_3 \leq \text{Req\_stop} \leq \text{Ref\_stop}+T_4.$$

Figure 6:
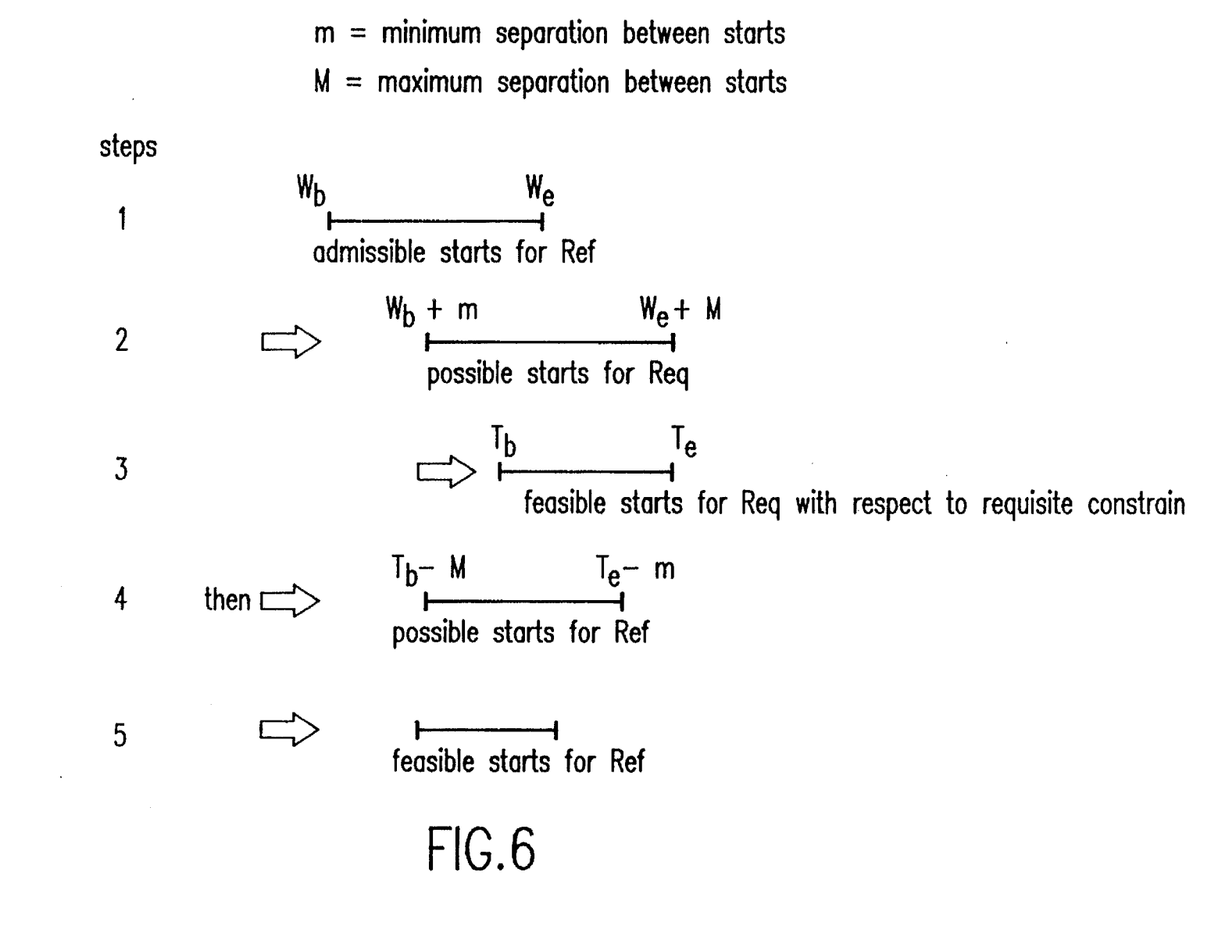
FIG. 6 is a time line illustration of the logic of a Req start constrained by a Ref start.

The five main processing steps used to determine a feasible segment are illustrated by the following example. FIG. 6 shows the example of the logic flow for the case where the start of one request, Req, is restricted to be at least m units from the start of another request, Ref, and at most M units from the start of Ref. Suppose Ref has admissible times in the interval (Wb,We). In the first step, identify admissible start times for Ref. Translate this segment to its corresponding set of admissible start times, Wb,We. Next, in step 2, impose the requisite constraints on the admissible start times for Ref. The conditions imposed on the admissible starts for Ref determine a range of possible starts for the requisite request, Req. In the third step, determine Req's feasible start times (Tb,Te) by intersecting Req's set of admissible starts with the set of possible starts in step 2. In step 4, enforce the requisite constraints back to Ref., i.e., determine the range of possible starts for Ref with respect to Req by translating the feasible starts for Req (Tb,Te) by the requisite constraints. Finally, from these restricted start and stop times for Ref, determine in step 5 the feasible starts for Ref., i.e., intersect the start times in steps 1 and 4 to achieve the feasible start times for Ref.

The existence of feasible start times for Ref means that there exists a segment for Ref which satisfies the requisite condition. That is, for each feasible start time for Ref, there exists a feasible start time for Req. The scheduling process continues to allocate resources for Ref using the feasible segment information. Immediately after scheduling Ref, an attempt is made to schedule Req, even if it was not originally next in the primary sort order. There is a possibility that the allocation of Ref's resources precludes the scheduling of Req. In that case, Ref is de-allocated, the resources freed up, and the requisite pair is labelled unscheduled. If there are not feasible start times for Ref, then the combination of Ref and Req is not scheduleable.

Figure 7:
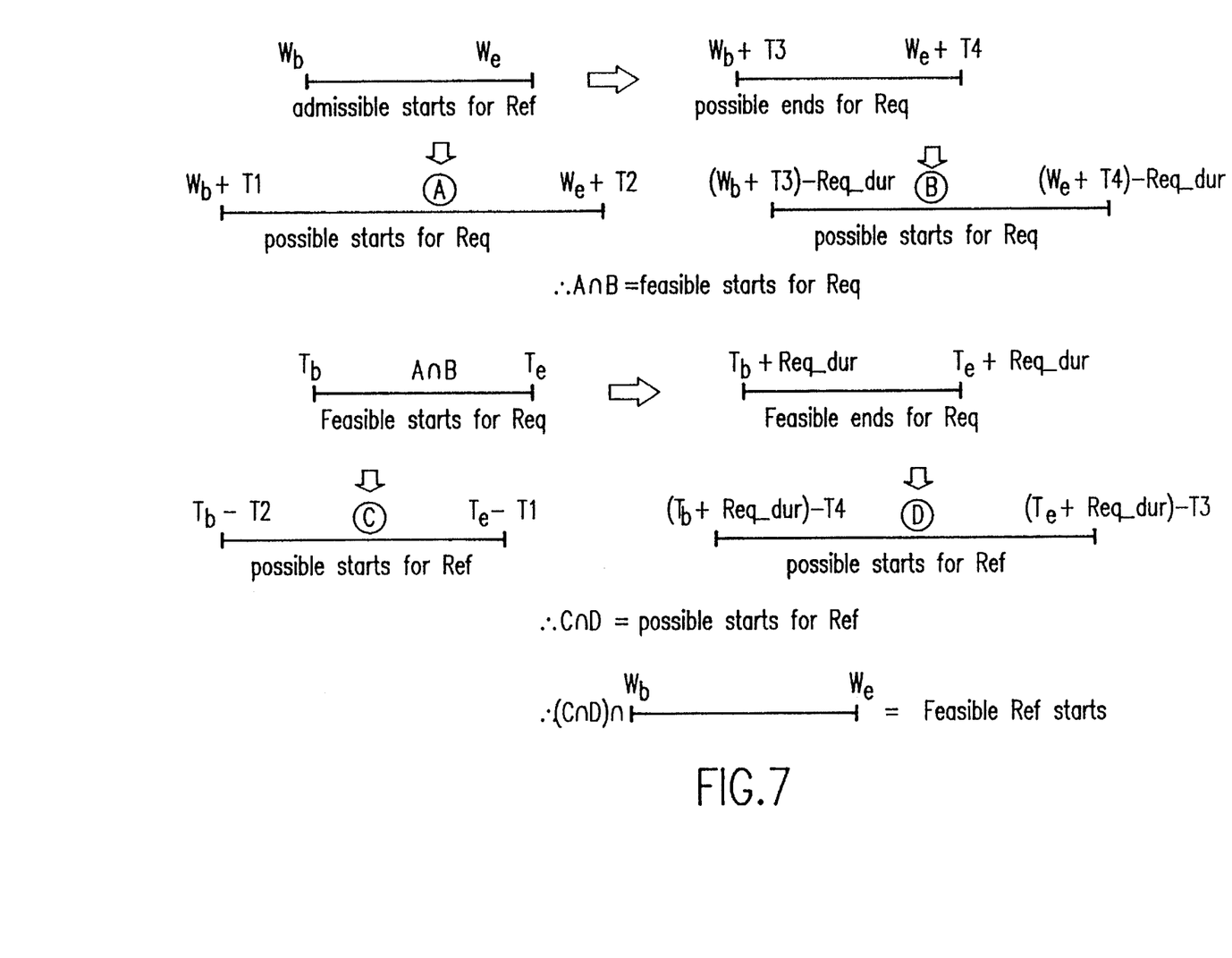
FIG. 7 is a time line illustration of the prerequisite constraint logic.

The five main requisite constraint processing steps as described above are applied to both the start times and the end times of Ref and Req of the prerequisite request logic as illustrated in FIG. 7. A similar approach is taken for corequisite and postrequisite constraint types.

The dynamic laxity, as determined in step 404 of FIG. 4, is a set of heuristics which computes allocation possibilities for a request by taking into account the remaining unscheduled requests with which it conflicts. The expert "rules of thumb" used to schedule a request which is in conflict with other unscheduled requests are, first, preempt as few remaining requests as possible, and second, maximize the possibilities remaining for the unscheduled requests. To do this the resource contention for all placements of R are identified. The allocation of resources to request R often necessitates making resources unavailable for remaining requests. The remaining requests to be scheduled are investigated, and if any request's resource demands overlap with R's resource requirements, for any portion of the segment of R, then that request is put in R's Conflict Set. To implement the Laxity rules, a characterization of the conflict between the request being scheduled, R, and a member of its Conflict Set, $R_j$, is used.

Figure 8:
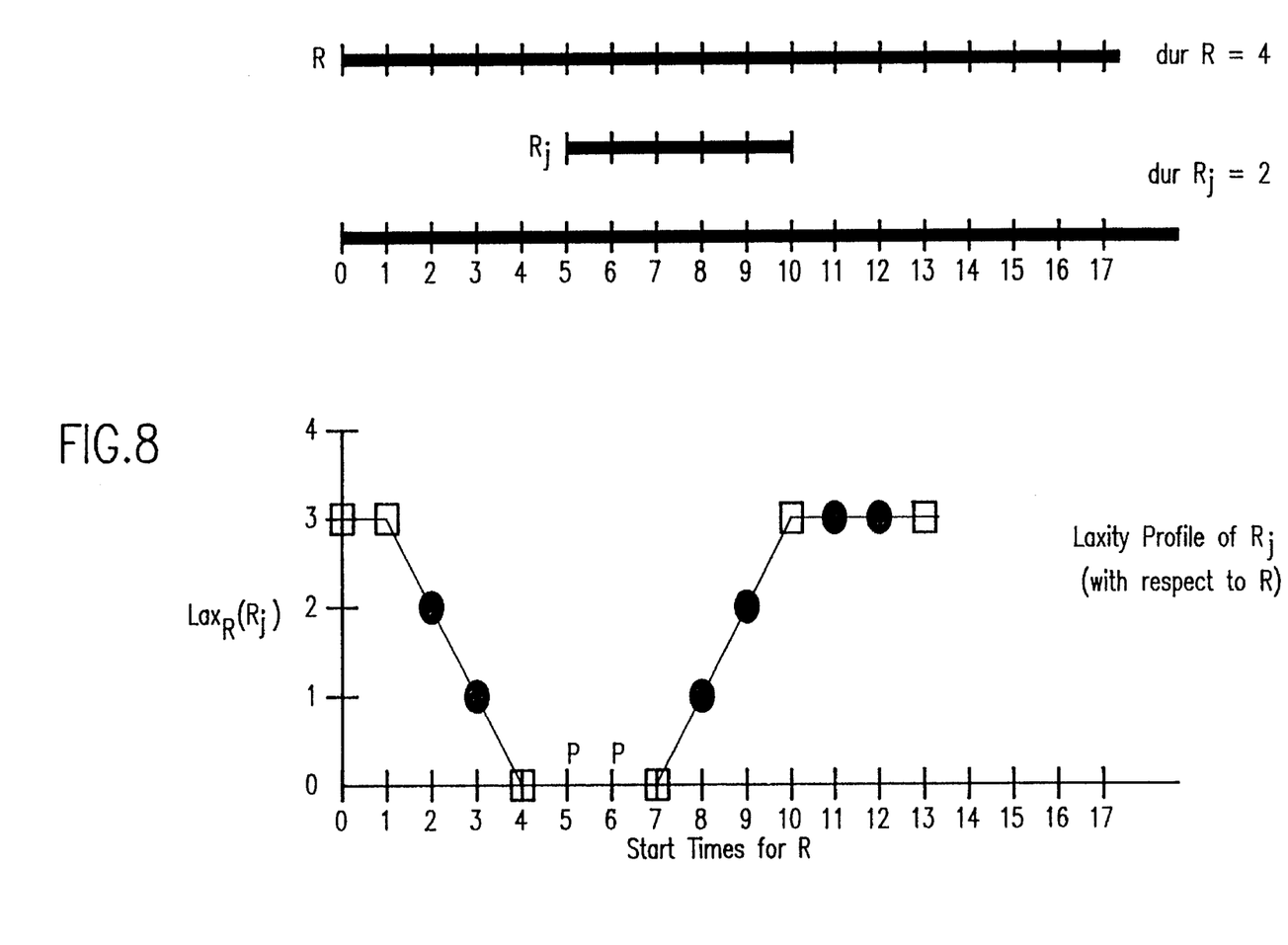
FIG. 8 is a graphical illustration of the laxity profile for the case of a request, R, which conflicts with a request $R_j$.

Consider the example illustrated in FIG. 8 where R is a request for a duration 4 whose segment is from 0 to 17. R conflicts with $R_j$, another request of duration 2 whose segment is from 5 to 10. The interaction of R with $R_j$ is shown by the Laxity Profile of $R_j$, with respect to R, which represents the effect on the possible start times for $R_j$ given the possible start times for R. If R is scheduled any time between 0 and 1, then R has no effect on $R_j$. That is, R would begin and end before overlapping any of $R_j$'s segment. The Laxity of $R_j$ is 3 or $R_j$'s segment length (5) minus $R_j$'s duration (2). The decreasing slope of $R_j$'s profile between times 1 and 4 indicates increasing interaction between R and $R_j$ as R's start times move from 1 to 4. If R is scheduled at time 2, then $R_j$'s segment would be decreased by 1, since R starting at 2 implies it ends at 2+4=6, producing a laxity for $R_j$ of 4−2=2. If R is scheduled at time 3, then $R_j$'s segment would be decreased by 2, producing a laxity for $R_j$ of 3−2=1. Notice that if R is scheduled at any time between 4 and 7, then $R_j$ would be preempted from possibly being scheduled. As R's start times move from 7 to 10, a decrease in interaction with $R_j$ is observed. If R is scheduled to start; any time between 10 and 13, then it has no interaction with $R_j$. If $R_j$ was the only member of R's Conflict Set, Laxity considerations would indicate that R should be scheduled to start from 0 and 1, or from 10 and 13 to allow for the most options for the future scheduling of $R_j$. The worst time to start R would be between 4 and 7, since that would necessitate preempting $R_j$. Any other time would allow the scheduling or $R_j$, but in a restricted portion of its segment.

Consider the six "boxed in" points on the Laxity profile of FIG. 8. These points are the earliest start, the latest start, the end time of the conflicting request $R_j$, and three other points which define regions of interaction between R and $R_j$. The first region, chronologically, is from where R would first overlap with $R_j$ (time 1) and ends when R would preempt $R_j$ (time 4). The next region is where R preempts $R_j$. The third region is where interaction decreases from preemption to no influence. Notice that the slope of the laxity profile in regions of partial interaction is ±1, since any change in R's start time changes the laxity of $R_j$ by the same amount. The laxity profiles can be stored as six points, since all the characteristics of the profile are contained in those six points, when coupled with the maximum and minimum laxity values for the profile. This greatly decreases investigation of the set of all possible start times for R.

Figure 9:
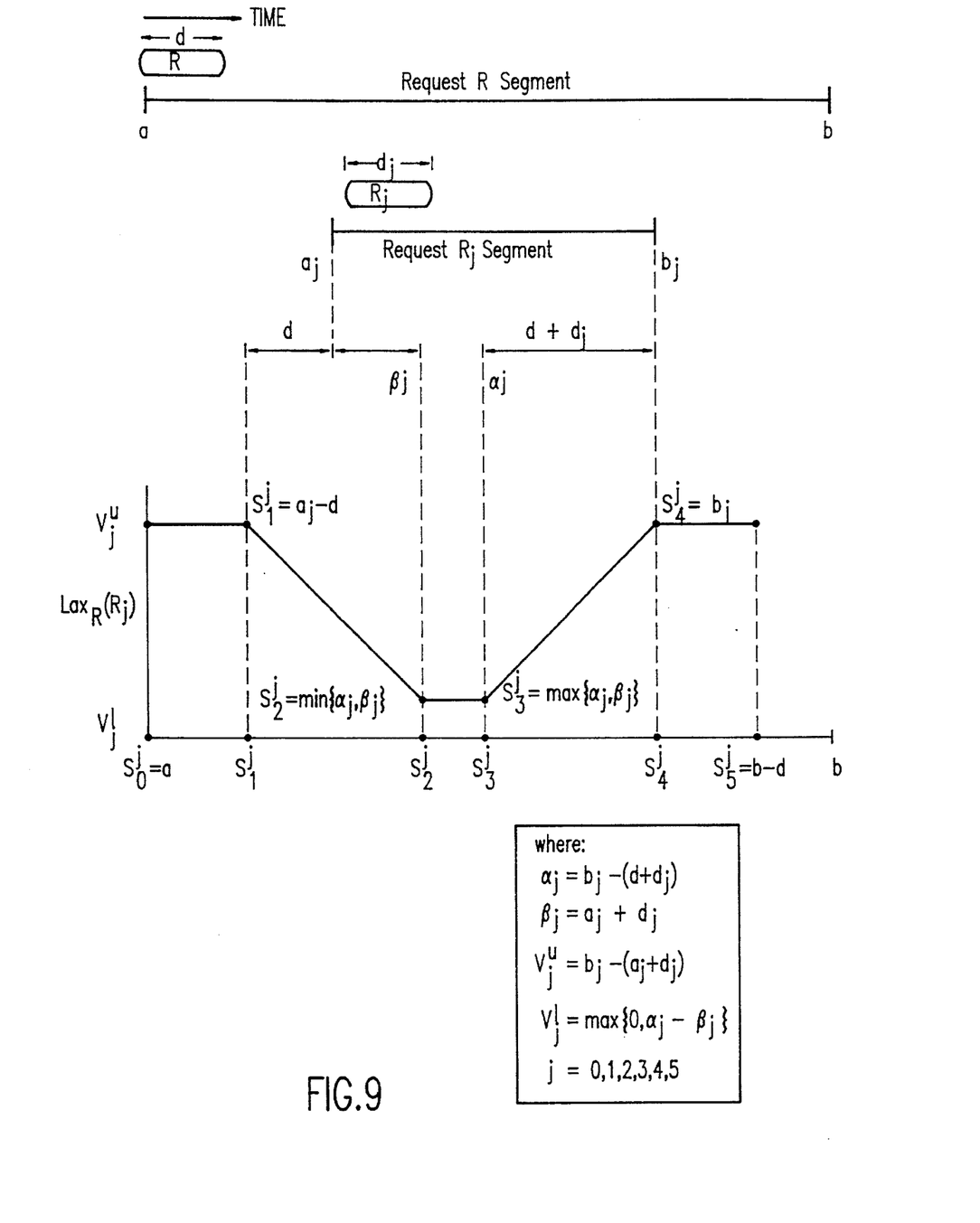
FIG. 9 is a graphical illustration of the laxity profile for the general case.

Given Request R, a duration d of segment (a,b) and a member of its conflict set, $R_j$ of duration $d_j$ and segment $(a_j,b_j)$, the laxity profile of $R_j$ with respect to R is shown in FIG. 9. Also indicated are expressions used to compute each of the six points in the laxity profile, as well as the maximum and minimum values of the profile. Laxity profiles are computed for each element $R_j$ in R's Conflict Set. Two approaches are used to obtain a resulting curve which models the interactions of R with all unscheduled requests. This curve is called the Laxity Function for R, $Lax_R(t)$. The first approach is expressed as follows:

$$Lax_R(t) = \min\{Lax_R(R_j), \text{ all } R_j \text{ in Conflict Set of } R\}.$$

This is a very conservative approach which would rule out all times where the scheduling of R would preempt any unscheduled request. The second approach is expressed as follows:

$$Lax_R(t) = \underset{\text{each } t}{\text{sum}} \; \{Lax_R(R_j), \text{ all } R_j \text{ in Conflict Set of } R\}, \text{normalized.}$$

This definition allows the greatest use of dynamic laxity heuristics, as the peaks of this curve correspond to the schedule placements which allow the most options for the remaining requests.

In the event of a request needing multiple resources in step 405 of FIG. 4, the Dynamic Laxity steps are repeated (i.e., return to the Feasible Segment Determination step 403) to produce Laxity Functions for R with respect to each necessary resource. When all of the Laxity Functions for R have been computed, then define $Laxity_R(t)$ to be the minimum of all such Laxity functions.

The worthiness determination step 406 in FIG. 4 considers a worth profile, $w_R(t)$, as the piecewise continuous function describing request R's scheduling worth versus time. This function is input with the request and provides the value if the request has its resources allocated during a particular time. The total worth of scheduling requests R, of duration D, at start time $t_0$ is therefore $$W_R(t_0) = \int_{t_0}^{t_0+D} W_R(t)dt.$$

Define the function $$W_R^*(t) = \int_{t}^{t+D} W_R(x)dx,$$

where t is an admissible start time for R. Normalize $w^*_R(C)$ to obtain the function $W_R(t)$, where $0 \leq W_R(t) \leq 1$ for all t admissible start times for R. The linguistic variable "Worthiness", as used in this invention, has a membership function $W_R(t)$ describing start times for R which are "worthwhile" for scheduling. The dynamic laxity function, $Laxity_R(t)$, when normalized, also represents a membership function, $0 \leq Laxity_R(t) \leq 1$, for the linguistic variable "flexible", describing start times for R which allow the greatest flexibility for future request scheduling.

By transferring dynamic laxity and worth into membership functions, we can now use fuzzy logic operations. Here, both of the concepts of Worthiness and Flexibility are combined to determine the "Best" start time for R. Consider the curve $B_R(t) = \min\{Laxity_R(t), W_R(t)\}$. This function is determined by both the worth profile of R and the look-ahead heuristics which leave as many options as possible for the remaining unscheduled requests. The maximum of B(t) over admissible start times t is called the "Best" start time for R's scheduling.

$$\text{Best time to schedule } R = \max_{t} \{B_R(t)\}$$

In fact, the method of scheduling using fuzzy set logic allows "Best" functions composed of weighted combinations of all pertinent attributes (linguistic variables) represented by their corresponding membership functions. This generalized scheme allows for the schedules to combine all pertinent factors. Such factors could include celestial variables (such as sun/moon/earth occulations), satellite momentum, workers (willingness to work, suitability to job), etc. For more information on fuzzy logic, see for example *Fuzzy Logic for the Management of Uncertainty*, edited by Lotsi Zadeh, published by John Wiley and Sons (1992), and especially Chapter 15, "Algorithms for Fuzzy Interface by Compact Rules".

R is now placed in the schedule in step 407 of FIG. 4 by the "Best time", computed in the last Step. The resources requested by R are allocated and removed from availability for subsequent processing in the scheduling process. As resources are allocated in step 408, the scheduling options are as a result restricted for the remaining requests. As part of the scheduling process, a decision is made as to whether the resource world state has changed significantly since the previous primary sort view of ranking. A reranking of the remaining requests is done, if warranted. The resort decision is based on resource considerations such as the number of requests since the last sort and the amount of processing time available before a deadline. If a certain percentage of requests have been scheduled, say, then resort would be done. If a deadline is reached, an operator may be warned to allow for exiting the process with the schedule "as is" in order to meet external timelines.

In summary, the invention provides a scheduling system that is effective to schedule resources in a complex resource constrained environment. Optimum durations are determined for each request to be scheduled. On the one hand, an attempt is made to schedule as many requests as possible in order to gain the most benefit of the available resources, and on the other hand, an attempt is made to schedule requests to maximize their worth. These disparate goals are reconciled using fuzzy logic, allowing for the scheduling of the requests in an optimum manner. While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A scheduling method for scheduling resources in a resource constrained environment comprising the steps of:

receiving a set of requests to be scheduled and inputting processing controls;

performing a primary sort of input requests to determine an order of request processing according to an importance ranking;

determining from the primary sort of input requests the times when a request could be scheduled with respect to constraints and resource availabilities;

determining a dynamic laxity using a set of heuristics which computes the allocation possibilities of a request by taking into account remaining unscheduled requests with which it conflicts;

combining multiple resources to account for those requests which require multiple concurrent resources after the step of determining the dynamic laxity; and then repeating steps of determining the times when a request could be scheduled and determining dynamic laxity;

making a worthiness determination of each request, said worthiness determination defining a function indicating advantageous start times admitting high work values;

determining a best start time for request scheduling by combining factors including worth and request interactions; and placing the requests into a schedule.

2. The scheduling method recited in claim 1 further comprising the step of resorting the primary sort in light of a present schedule and processing controls.

3. A scheduling method for scheduling resources in a resource constrained environment comprising the steps of:

receiving a set of requests to be scheduled and inputting processing controls;

performing a primary sort of input requests to determine an order of request processing according to an importance ranking;

determining from the primary sort of input requests the times when a request could be scheduled with respect to constraints and resource availabilities, wherein said step of determining the times when a request could be scheduled includes the step of determining feasible segments for temporally paired requests;

determining a dynamic laxity using a set of heuristics which computes the allocation possibilities of a request by taking into account remaining unscheduled requests with which it conflicts;

making a worthiness determination of each request, said worthiness determination defining a function indicating advantageous start times admitting high work values;

determining a best start time for request scheduling by combining factors including worth and request interactions; and placing the requests into a schedule.

4. The scheduling method recited in claim 3 further comprising the steps of:

determining after the processing of a request whether the processed request is a paired request;

immediately repeating the steps beginning with the step of determining the times when a request could scheduled for a request paired with the processed request.

5. The scheduling method recited in claim 3 further comprising the step of determining after the step of placing requests into a schedule whether a time limit for the scheduling process has expired, and if so, accepting scheduled requests.

6. The scheduling method recited in claim 5 wherein if the time limit for the scheduling process has not expired, further comprising the step of resorting the primary sort in light of a present schedule and processing controls.

7. The scheduling method recited in claim 6 wherein in the step of resorting is performed periodically during the scheduling process after each iteration of the process through the step of placing requests into a schedule.

8. The scheduling method recited in claim 7 further comprising the steps of:

combining multiple resources to account for those requests which require multiple concurrent resources after the step of determining the dynamic laxity; and then repeating steps of determining the times when a request could be scheduled and determining dynamic laxity.

9. A scheduling system for scheduling resources in a resource constrained environment comprising:

means for receiving a set of requests to be scheduled and inputting processing controls;

means for performing a primary sort of input requests to determine an order of request processing according to an importance ranking;

means for combining multiple resources to account for those requests which require multiple concurrent resources;

means for determining from the primary sort of input requests the times when a request could be scheduled with respect to constraints and resource availabilities;

means for determining a dynamic laxity using a set of heuristics which computes the allocation possibilities of a request by taking into account remaining unscheduled requests with which it conflicts;

means for making a worthiness determination of each request, said worthiness determination defining a function indicating advantageous start times admitting high worth values;

means for determining a best start time for request scheduling by combining factors including worth and request interactions; and means for placing the requests into a schedule.

10. The scheduling system recited in claim 9 wherein the means for determining the times when a request could be scheduled determines feasible segments for temporally paired requests.

11. The scheduling system recited in claim 10 wherein periodically the scheduling system periodically resorts the primary sort in light of a present schedule and processing controls as output by the means for placing requests into the schedule.

12. The scheduling system recited in claim 10 wherein the means for placing the requests in the schedule determines whether the processed request is a paired request, and if so, transfers control to the means for determining the times when a request could scheduled in order to process a request paired with the processed request.

* * * * *